H. A. S. HOWARTH.
CRANK PIN LUBRICATING MEANS.
APPLICATION FILED MAR. 26, 1917.

1,363,789.

Patented Dec. 28, 1920.
2 SHEETS—SHEET 1.

WITNESSES

INVENTOR

H. A. S. HOWARTH.
CRANK PIN LUBRICATING MEANS.
APPLICATION FILED MAR. 26, 1917.
1,363,789.
Patented Dec. 28, 1920.
2 SHEETS—SHEET 2.
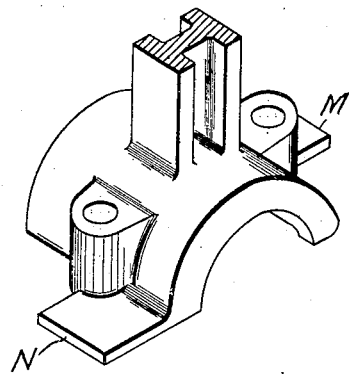
FIG. 9
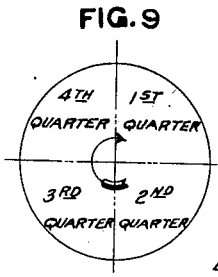
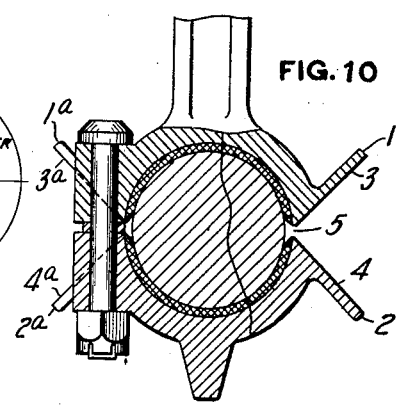
FIG. 10
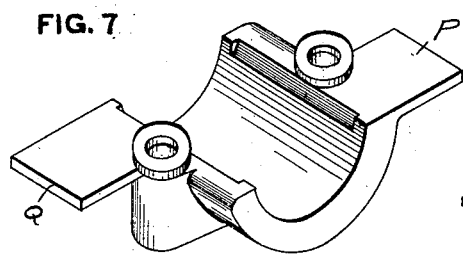
FIG. 7   FIG. 14
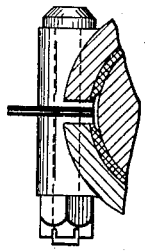
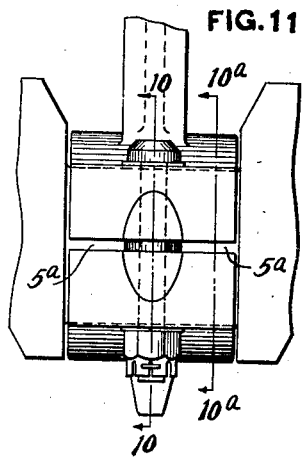
FIG. 11
FIG. 13
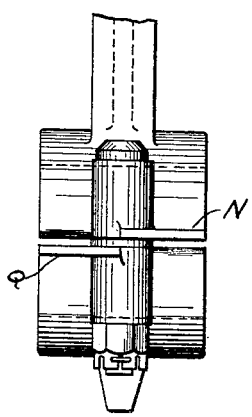
FIG. 8
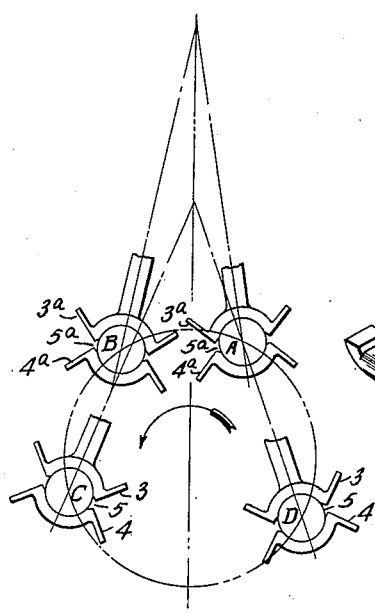
FIG. 12
WITNESSES
INVENTOR

UNITED STATES PATENT OFFICE.

HARRY A. S. HOWARTH, OF PITTSBURGH, PENNSYLVANIA.

CRANK-PIN-LUBRICATING MEANS.

1,363,789.     Specification of Letters Patent.     Patented Dec. 28, 1920.

Application filed March 26, 1917. Serial No. 157,426.

*To all whom it may concern:*

Be it known that I, HARRY A. S. HOWARTH, a citizen of the United States, and a resident of Pittsburgh, in the county of Allegheny and State of Pennsylvania, have made a new and useful Invention in Improvements in Crank-Pin-Lubricating Means, of which the following is a specification.

This invention relates to improvements in crank pin lubricating means.

With the advent of high speed internal combustion engines such as now used in automobiles, copious lubrication of the crank pins and connecting rod bearings has become of great importance.

In the various methods of crank pin lubrication now in practice and with which I am familiar, adequate lubrication of the pins and connecting rod bearings is not obtained. The splash system which is largely used is not entirely satisfactory for high speed work because of its intermittent character and the incorrect location of the oil supply holes and the lack of assurance of the oil reaching the bearing surfaces in sufficient quantities. The present systems of forced lubrication for the connecting rod bearings and crank pins is complex and expensive. The oil in most of the splash systems used is delivered to the crank pin bearings at the point of highest oil film pressure. These delivery openings to the bearing surfaces serve as discharge orifices part of the time and some of the oil which should remain between the bearing surfaces is allowed to escape, thereby rendering these methods defective on this score alone.

An object of this invention is to provide simple inexpensive means by which ample and copious lubrication may be supplied to the crank pin-and-connecting-rod bearing surfaces in a practically continuous manner; means by which lubrication will be automatically projected or deflected to the connecting rod and crank pin bearing surfaces throughout the entire travel of the crank pin in a way that will render such lubrication most effective. This as well as other objects, which will readily appear to those skilled in the art, I attain by means of the devices described in the specifications and illustrated in the accompanying drawings.

In the drawings Figure 1 is a fragmentary side elevation of a connecting rod and crank pin forming a connecting rod assembly in which this invention is embodied.

Fig. 2 is a cross sectional view of the connecting rod and crank pin assembly shown in Fig. 1, and the left hand portion of said view is taken along the line 2—2 of Fig. 1; while the right hand portion is taken along the line 2ᴬ—2ᴬ of Fig. 1.

Fig. 3 comprises detail views in perspective of the deflecting plate embodied in the assembly illustrated in Figs. 1 and 2.

Fig. 7 embraces two views in perspective of a modified form of connecting rod and cap in which this invention is incorporated.

Fig. 8 is a side elevation of the connecting rod assembly, embodying connecting rod and cap illustrated in the views of Fig. 7.

Fig. 9 is a diagrammatic view illustrating the four quarters of the path of travel of the crank pin shown in the connecting rod assembly of Fig. 8.

Fig. 10 is a view in cross section of a modification of this invention. The left side of this view is a section taken along the line of 10—10 of Fig. 11, while the right side is a section taken along the line 10ᴬ—10ᴬ of Fig. 11.

Fig. 11 is a fragmentary side elevation of the connecting rod cap and crank pin of Fig. 10.

Fig. 12 is a diagrammatic view illustrating broadly the scheme of lubrication of the modified form of this invention illustrated in Figs. 10 and 11.

Fig. 13 is a view in perspective of a connecting rod cap showing a construction which may be utilized in the make-up of a connecting rod assembly embodying this invention.

Fig. 14 is a fragmentary view in cross section of a connecting rod assembly including connecting rod, cap, crank pin and deflecting plate embodying the construction illustrated in Fig. 13.

Figure 1:
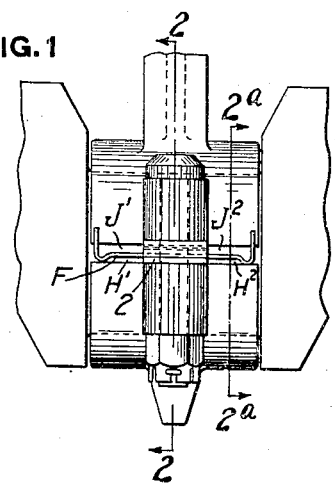
Figure 2:
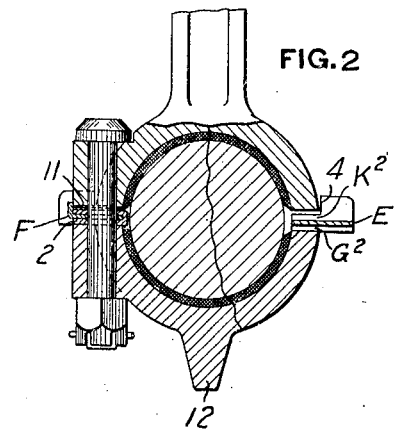
Figure 3:
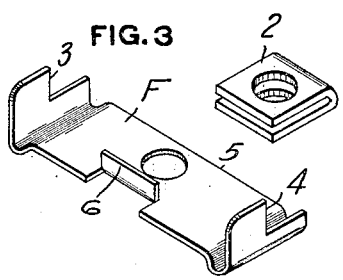

In the form of invention illustrated in Figs. 1, 2 and 3, plate F for deflecting oil from the path of travel of the crank pin is held between the two lips of the spacer 2 and with the spacer is clamped between the connecting rod and its cap by one of the connecting rod bolts which passes through holes formed in the spacer and deflector; the spacer and deflector take the place of space usually occupied by shims. The deflecting plate or deflector, is formed with extensions 3 and 4 which serve to prevent the same from moving out of position and keep its inner edge 5 parallel with the crank pin surface. If it is desired shims may be used in conjunction with the distance piece as illustrated at 11 in Fig. 2, to prevent the connecting rod cap from clamping too tight on the crank pink. A lip 6 is provided which keeps the shims in position.

With this construction openings H¹ and H² are maintained below the deflector plate F and openings J¹ and J² above it as shown in Fig. 1.

The opposite sides of the connecting rod will preferably be the same and are so illustrated in Fig. 2, but for the purpose of explaining the operation, the deflecting plate on the opposite side of the plate F is lettered E while the space corresponding to J² is marked K² and the space corresponding to H² is marked G².

The connecting rod cap is provided with an extension 12 which is adapted to dip into the oil below it in the crank case and throw it into the air in the path of the crank pin and deflecting plates. This thrower 12 would also serve to throw oil on to the inside of the crank case and from this it would deflect, splash or drip back into the path of travel of the crank pin and deflecting plates.

If desired, of course, the splash feature may be omitted and oil from any suitable source dropped or sprayed into the path of travel of the crank pin and deflecting plates. However, the particular means employed to bring the oil into the path of the crank pin and deflecting plates is not a part of my invention.

Figure 5:
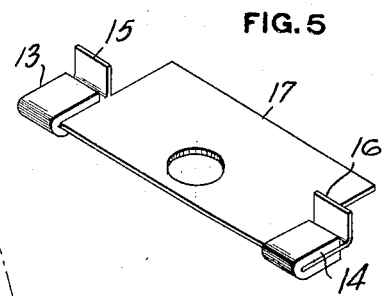
Figs. 5 and 6 are detail views in perspective of a modified form of deflecting plate and spacer for the connecting rod and its cap which may be utilized in this invention.
Figure 6:
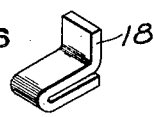

In Fig. 5 I have shown a modification of the deflecting plate shown in Figs. 1, 2 and 3 and in this construction there are two distance pieces 13 and 14 instead of the single piece 2 as shown in said views. There are also two lips, 15 and 16 provided, instead of the single lip 6. Since the distance pieces 13 and 14 are not held in place by the connecting rod bolts, they must be firmly secured to the deflecting plate 17, or else constructed as shown in Fig. 6 in which figure a lip 18 is made integral with the distance piece for the purpose of holding the distance pieces in place. Whether the form shown in Fig. 5 or 6 is used it would be preferable to firmly attach the distance pieces to the deflecting plate for ease of handling. Lips 15 and 16 serve the double purpose of keeping the edges of the deflecting plate 17 and the edges of the shims (not shown) parallel with the surface of the crank pin.

Figure 4:
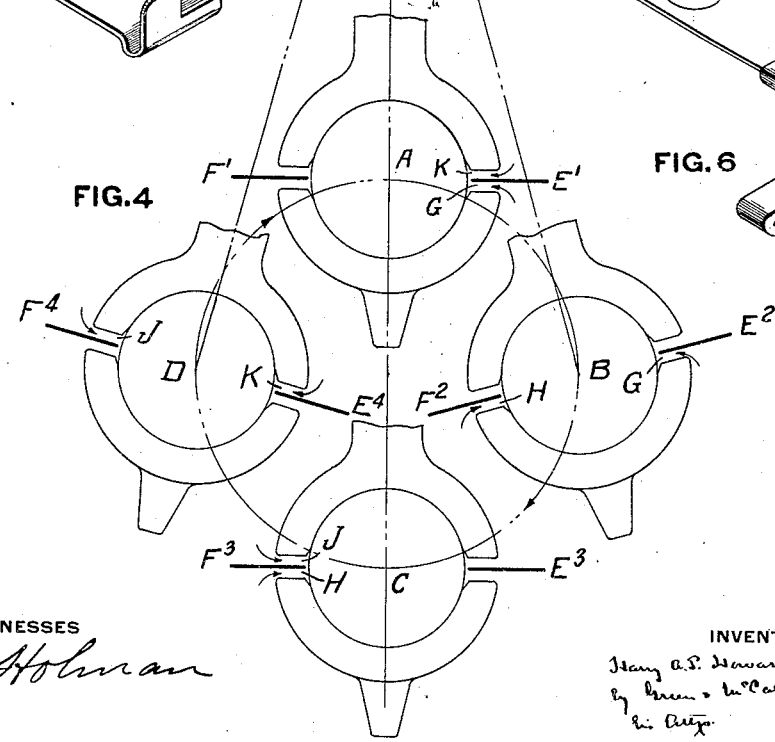
Fig. 4 is a diagrammatic view illustrating broadly the scheme of lubrication embodied in this invention.

In the diagram shown in Fig. 4 I have assumed that the connecting rod in revolving dips into oil in the crank case and causes it to splash or spray about in the crank case, or that oil is sprayed or dropped into the path of travel of the crank pin or connecting rod. The oil may be in the form of drops or spray or in fact any physical condition, so long as it passes into the path of travel of the crank pin. The deflecting plates will deflect the oil from the path of travel of the crank pin in such a way as to effectively, continuously and copiously lubricate the pin and connecting rod bearing surfaces. The oil in the path of travel of the pin may be moving in any direction or it may be relatively stationary. The crank pin when revolving rapidly will move much faster than the oil in its path, and, as the deflecting plates come in contact with the oil they will deflect it against the crank pin in the same way as a moving drop of oil striking a stationary surface is splashed or deflected by said surface.

Referring to Fig. 4, while the crank pin is moving from A to B the deflecting plate E is moving from E¹ to E²; hence its under surface will strike any oil in its path which is moving relatively slower and deflect it into the opening G against the crank pin. While the pin moves from B to C the under side of the plate F will deflect the oil from its path into the space H against the pin as the plate moves from F² to F³. As the crank pin moves from C to D the upper side of the plate F will deflect the oil into the space J against the crank pin while the plate moves from F³ to F⁴. As the crank pin moves from D to A the oil in its path will be deflected by the upper surface of plate E through the opening K against the crank pin while the plate moves from E⁴ to E¹. There is some overlapping of the effective ranges of action of the deflecting surfaces of the plates that renders them even more effective than above described.

The deflecting plates do not touch the crank pin surface. Hence whatever the direction of rotation of the pin relative to the plate, the oil can be carried along the pin surface without being scraped off by the deflecting plates.

With the device shown in Figs. 1 to 6 inclusive, the oil supplied to the crank pin by deflecting surfaces will be supplied during the complete revolution of the pin and the supply, therefore, may be considered continuous.

If desired, the deflecting plate can be used on one side of the connecting rod only: it is preferable, however, to use the double arrangement. If, however, the single arrangement is used the pin would receive considerable oil and possibly sufficient for adequate lubrication. I prefer, however, to be on the safe side and use the double arrangement.

In Figs. 7 to 9 inclusive, I have shown a modification of this invention in which separate deflecting plates as above described are omitted and deflecting surfaces are formed on the connecting rod and the cap. The connecting rod is formed with surfaces M and N in the nature of extensions and the cap is formed with surfaces P and Q, also in the nature of extensions. As illustrated, these extensions extend half way across the connecting rod and the cap and for the purpose of spacing the cap from the connecting rod to secure proper adjustment of the bearing, spacing washers or shims, as illustrated in Fig. 7 may be used, or the distance piece may be made integral with the cap or rod or both.

With clock-wise rotation of this connecting rod assembly, the lower surface of extension M would deflect oil against the pin in the first quarter of a revolution. The lower surface of extension N would do the same in the second quarter. Extensions P and Q would deflect oil in the third and fourth quarters respectively. This construction would lubricate the bearing surfaces continuously but not as effectively as the device shown in Figs. 1 to 6, because in the device just described the deflecting surfaces are half as wide as the deflecting plates.

In the modification shown in Figs. 10 and 11 the deflecting surface extends clear across the connecting rod and cap with the exception of an interruption at the center by the connecting rod bolt. The rod has lips 1 and 1$^A$, and the cap lips 2 and 2$^A$. Referring to lips 1 and 2 it is evident that the lower side of lip 1 has surface 3, and the upper side of lip 2 has surface 4 which will act upon the oil in the path of the crank pin and deflect it through opening 5 against the crank pin during certain portions of the revolution.

Fig. 12 is included for the purpose of illustrating the operation of this modification and in this view it is assumed that the rotation of the pin is counter clock-wise. While the crank pin is moving from A to B the deflecting surfaces 3$^A$ and 4$^A$ (either or both) will cause oil to pass through opening 5$^A$ against the crank pin. While the crank pin is moving from C to D, oil will be deflected by surfaces 3 and 4 (either or both) through opening 5 against the crank pin. In this modification the deflecting surfaces are inactive between positions B and C and positions D and A. The range of action and inaction can be varied by altering the angles the deflecting surfaces make with one another.

In the modification shown in Figs. 13 and 14 if the end of the connecting rod is formed like the cap illustrated in Fig. 13 the deflecting surfaces shown in Fig. 14 will act in the same manner as the deflecting surfaces in diagram of Fig. 4. The distance pieces, however, are integral with the cap and rod.

Fig. 14 shows the deflecting plate made up of several thicknesses, all alike in width. The plate when so constructed serves the double purpose of deflecting plate and shims.

Having thus described my invention what I claim is:

1. In combination with the crank pin and connecting rod of an engine, means associated and movable with the crank pin bearing and provided with lubricant collecting surfaces projecting laterally from the crank pin bearing and arranged to deflect lubricant to said pin from the air throughout substantially the entire travel of the pin during each revolution of the pin.

2. In combination with the crank pin and connecting rod of an engine, a crank case inclosing the crank pin, means for causing the air within the case to be laden with finely divided lubricant, and lubricant collecting means, comprising lubricant collecting and deflecting surfaces associated with and projecting from said pin and arranged to collect lubricant from the air in the path of travel of the pin during substantially the complete travel of the pin and to deliver the lubricant so collected to the pin.

3. In combination with the crank pin and connecting rod of an engine, a bearing for said pin provided with a lubricant admission opening, and means associated with said bearing and projecting laterally from said opening for collecting lubricant from the lubricant laden air in the path of travel of the pin during substantially the entire travel of the pin, and for delivering the lubricant so collected through said opening to said pin.

4. In combination with a crank pin and connecting rod, means for causing the air surrounding said rod to be laden with oil in finely divided state, multiple oil deflecting surfaced means movable with said rod and constructed and arranged to deflect oil from the air surrounding said rod to said pin during the complete travel of said pin through its course.

5. In combination with a crank pin, a connecting rod assembly constructed so as to provide oil openings located substantially in an axial plane perpendicular to the plane passing through the axes of the crank and wrist pins, and multi-surfaced deflectors projecting laterally from said connecting rod and so arranged with relation to said openings as to cause oil from said air to be deflected to said pin during the major portion of the travel of said pin through its path.

6. In combination with a crank pin and its connecting rod, a crank pin bearing having an opening along a lateral face of the pin, oil collecting and deflecting means projecting laterally from said bearing and arranged to collect and deflect oil while said crank pin bearing is moving in any direction.

7. In combination with a crank pin and its connecting rod and cap, means for spacing said cap from said rod and for providing multiple surfaced deflectors projecting laterally beyond said rod, and means for causing the space immediately surrounding said rod to be laden with oil so that said surfaces during the travel of said rod deflect oil to said pin.

8. In combination with a crank pin and its connecting rod and cap, a deflector plate secured in place between said rod and cap and arranged so that its opposite sides are capable of deflecting oil from the air surrounding said rod to said pin.

9. In combination with a crank pin and its associated connecting rod, a cap spaced from the rod so as to provide lubricant receiving openings in the pin bearing, shims between said cap and rod on each side of the pin, so arranged that at least one shim projects into each opening and extends laterally to form a lubricant collecting and deflecting plate, which delivers lubricant collected on each side thereof to the pin.

10. In combination with a crank pin and its associated connecting rod, a cap spaced from the rod so as to form a lubricant delivery opening through the pin bearing to the pin, and an outwardly extending deflector projecting into said opening and so located with relation thereto as to provide a lubricant delivery space on each side of the deflector.

In testimony whereof I have hereunto subscribed my name this 23rd day of March, 1917.

HARRY A. S. HOWARTH.

Witnesses:
MARY LAVELLE,
EMMA LEA MONTGOMERY.